United States Patent
Yokokawa et al.

(10) Patent No.: US 8,238,459 B2
(45) Date of Patent: Aug. 7, 2012

(54) DECODING DEVICE AND METHOD, RECEIVING DEVICE AND METHOD, AND PROGRAM

(75) Inventors: Takashi Yokokawa, Kanagawa (JP); Yasuhiro Iida, Tokyo (JP); Toshiyuki Miyauchi, Kanagawa (JP); Takashi Hagiwara, Tokyo (JP); Takanori Minamino, Kanagawa (JP); Naoya Haneda, Kanagawa (JP)

(73) Assignee: Sony Corporation, Tokyo (JP)

( * ) Notice: Subject to any disclaimer, the term of this patent is extended or adjusted under 35 U.S.C. 154(b) by 734 days.

(21) Appl. No.: 12/361,199

(22) Filed: Jan. 28, 2009

(65) Prior Publication Data

US 2009/0190695 A1    Jul. 30, 2009

(30) Foreign Application Priority Data

Jan. 30, 2008    (JP) ................... P2008-018536

(51) Int. Cl.
*H04L 23/02*    (2006.01)
(52) U.S. Cl. ........ 375/262; 375/261; 375/322; 375/341; 714/792; 714/755; 714/751
(58) Field of Classification Search ........... 375/262, 375/261, 322, 341; 714/792, 755, 751
See application file for complete search history.

(56) References Cited

U.S. PATENT DOCUMENTS

| | | | | |
|---|---|---|---|---|
| 5,684,832 A | * | 11/1997 | Adachi et al. | 375/262 |
| 2006/0045214 A1 | * | 3/2006 | Shiina | 375/341 |
| 2006/0274845 A1 | * | 12/2006 | Chiang et al. | 375/261 |
| 2008/0008257 A1 | * | 1/2008 | Yonesi et al. | 375/262 |

FOREIGN PATENT DOCUMENTS

JP    9 247226    9/1997

* cited by examiner

*Primary Examiner* — Eva Puente
(74) *Attorney, Agent, or Firm* — Frommer Lawrence & Haug LLP; William S. Frommer; Paul A. Levy (57) ABSTRACT

A decoding device that decodes demodulated data obtained by demodulating a quadrature modulated signal arising from digital modulation of a carrier and detects synchronization, the decoding device includes, a decoder configured to decode first demodulated data that is the demodulated data obtained by demodulating the quadrature modulated signal and is composed of in-phase axis data and quadrature axis data. The decoding device decodes second demodulated data obtained by interchanging the in-phase axis data and the quadrature axis data of the first demodulated data. A synchronization detector is configured to detect a boundary between predetermined information symbol sequences from first decoded data obtained by decoding the first demodulated data and detect the boundary from second decoded data obtained by decoding the second demodulated data. The synchronization detector selects and outputs one of the first decoded data and the second decoded data based on a result of the detection of the boundary.

10 Claims, 10 Drawing Sheets

DECODING DEVICE AND METHOD, RECEIVING DEVICE AND METHOD, AND PROGRAM

CROSS REFERENCES TO RELATED APPLICATIONS

The present invention contains subject matter related to Japanese Patent Application JP 2008-018536 filed in the Japan Patent Office on Jan. 30, 2008, the entire contents of which being incorporated herein by reference.

BACKGROUND OF THE INVENTION

1. Field of the Invention

The present invention relates to decoding devices and methods, receiving devices and methods, and programs, and particularly to decoding device and method, receiving device and method, and a program that each allow synchronization at high speed even when the frequency spectrum is inverted.

2. Description of Related Art

It is known that, if quadrature amplitude modulation (QAM) as one of multilevel quadrature amplitude modulation schemes is employed, demodulated data involves phase ambiguity of zero degrees, 90 degrees, 180 degrees, and 270 degrees because it is impossible to determine the absolute phase in demodulation processing.

As a related-art scheme for removing such phase ambiguity, there has been proposed e.g. a coded modulation system described in "Rotationally Invariant Convolutional Channel Coding with Expanded Signal Space—Part II: Nonlinear Codes" (IEEE Journal on selected areas in communications, Vol. SAC-2, No. 5, September 1984) (this document will be referred to as Document 1, hereinafter).

In the scheme proposed in Document 1, relative phase data subjected to differential coding is modulated on the transmission side, and demodulated relative phase data is subjected to differential decoding so as to be converted into absolute phase data on the reception side. This allows achievement of correct data even when the phase is rotationally shifted (90 degrees, 180 degrees, 270 degrees) between the modulation and the demodulation.

Furthermore, as disclosed in Japanese Patent Laid-open No. Hei 9-247226 (referred to as Patent document 1, hereinafter), there has also been proposed a scheme in which, if the relationship between the upper side band and the lower side band of the frequency spectrum in demodulation is opposite to that in modulation, the in-phase axis and the quadrature axis are switched to thereby absorb ambiguity of the quadrature phase and thus stably carry out demodulation. Moreover, there has also been proposed a scheme in which, for the case of a signal constellation of rotational symmetry, the bit configuration of data is changed to thereby achieve an effect equivalent to that of the state in which the in-phase axis and the quadrature axis are interchanged.

That is, the technique of Patent document 1 has been proposed in order to solve the problem that it is impossible for the technique of Document 1 to achieve correct data if the frequency spectrum is inverted between modulation and demodulation.

SUMMARY OF THE INVENTION

However, in related-art techniques including those of Patent document 1 and Document 1, determination as to whether or not the frequency spectrum is inverted is made through feedback of the synchronization state and the error measurement result obtained in post-stage processing. Therefore, the related-art techniques involve a problem that, if the frequency spectrum is inverted, it takes long time to obtain correct decoded data compared with the case in which the frequency spectrum is not inverted.

Furthermore, in some cases, the synchronization state and the error measurement result are affected by a factor other than the inversion of the frequency spectrum, such as noise on the transmission path. Therefore, when synchronization can not be obtained or when the occurrence of many errors is found, demodulation often results in failure even if the in-phase axis and the quadrature axis are interchanged.

To address this problem, it would be possible to employ a scheme of changing the details of demodulation processing depending on various factors. However, this scheme is required to change the details of demodulation processing for both the case in which the frequency spectrum is inverted and the case in which the frequency spectrum is not inverted, and therefore a problem is involved that it takes further longer time to obtain correct decoded data.

There is a need for the present invention to allow synchronization at high speed without reattempting synchronization detection and so on even when the frequency spectrum is inverted.

According to an embodiment of the present invention, there is provided a decoding device that decodes demodulated data obtained by demodulating a quadrature modulated signal arising from digital modulation of a carrier and detects synchronization. The decoding device includes a decoder configured to decode first demodulated data that is the demodulated data obtained by demodulating the quadrature modulated signal and is composed of in-phase axis data and quadrature axis data, and decode second demodulated data obtained by interchanging the in-phase axis data and the quadrature axis data of the first demodulated data. The decoding device further includes a synchronization detector configured to detect the boundary between predetermined information symbol sequences from first decoded data obtained by decoding the first demodulated data and detect the boundary from second decoded data obtained by decoding the second demodulated data. The synchronization detector selects and outputs one of the first decoded data and the second decoded data based on the result of the detection of the boundary.

According to the embodiment of the present invention, there is also provided a decoding method of a decoding device that decodes demodulated data obtained by demodulating a quadrature modulated signal arising from digital modulation of a carrier and detects synchronization. The decoding method includes the step of decoding first demodulated data that is the demodulated data obtained by demodulating the quadrature modulated signal and is composed of in-phase axis data and quadrature axis data, and decoding second demodulated data obtained by interchanging the in-phase axis data and the quadrature axis data of the first demodulated data. The decoding method further includes the step of detecting the boundary between predetermined information symbol sequences from first decoded data obtained by decoding the first demodulated data and detecting the boundary from second decoded data obtained by decoding the second demodulated data, and selecting and outputting one of the first decoded data and the second decoded data based on the result of the detection of the boundary.

According to the embodiment of the present invention, there is also provided a program corresponding to the above-described decoding method according to the first aspect of the present invention.

In the decoding device, the decoding method, and the program according to the first aspect of the present invention, the first demodulated data that is the demodulated data obtained by demodulating the quadrature modulated signal and is composed of the in-phase axis data and the quadrature axis data is decoded, and the second demodulated data obtained by interchanging the in-phase axis data and the quadrature axis data of the first demodulated data is decoded. Furthermore, the boundary between the predetermined information symbol sequences is detected from the first decoded data obtained by decoding the first demodulated data, and the boundary between the predetermined information symbol sequences is detected from the second decoded data obtained by decoding the second demodulated data. Based on the result of the boundary detection, either one of the first decoded data and the second decoded data is selected and output.

According to another embodiment of the present invention, there is provided a receiving device that receives a quadrature modulated signal arising from digital modulation of a carrier. The receiving device includes a decoder configured to decode first demodulated data that is demodulated data obtained by demodulating the quadrature modulated signal and is composed of in-phase axis data and quadrature axis data, and decode second demodulated data obtained by interchanging the in-phase axis data and the quadrature axis data of the first demodulated data. The receiving device further includes a synchronization detector configured to detect the boundary between predetermined information symbol sequences from first decoded data obtained by decoding the first demodulated data and detect the boundary from second decoded data obtained by decoding the second demodulated data. The synchronization detector selects and outputs one of the first decoded data and the second decoded data based on the result of the detection of the boundary.

According to the embodiment of the present invention, there is also provided a receiving method of a receiving device that receives a quadrature modulated signal arising from digital modulation of a carrier. The receiving method includes the step of decoding first demodulated data that is demodulated data obtained by demodulating the quadrature modulated signal and is composed of in-phase axis data and quadrature axis data, and decoding second demodulated data obtained by interchanging the in-phase axis data and the quadrature axis data of the first demodulated data. The receiving method further includes the step of detecting the boundary between predetermined information symbol sequences from first decoded data obtained by decoding the first demodulated data and detecting the boundary from second decoded data obtained by decoding the second demodulated data, and selecting and outputting one of the first decoded data and the second decoded data based on the result of the detection of the boundary.

According to the embodiment of the present invention, there is also provided a program corresponding to the above-described receiving method according to the embodiment of the present invention.

In the receiving device, the receiving method, and the program according to the embodiment of the present invention, the first demodulated data that is the demodulated data obtained by demodulating the quadrature modulated signal and is composed of the in-phase axis data and the quadrature axis data is decoded, and the second demodulated data obtained by interchanging the in-phase axis data and the quadrature axis data of the first demodulated data is decoded. Furthermore, the boundary between the predetermined information symbol sequences is detected from the first decoded data obtained by decoding the first demodulated data, and the boundary between the predetermined information symbol sequences is detected from the second decoded data obtained by decoding the second demodulated data. Based on the result of the boundary detection, either one of the first decoded data and the second decoded data is selected and output.

In the above-described manner, the embodiments of the present invention allow synchronization at high speed even when the frequency spectrum is inverted.

DETAILED DESCRIPTION OF THE PREFERRED EMBODIMENTS

Embodiments of the present invention will be described below with reference to the drawings.

Figure 1:
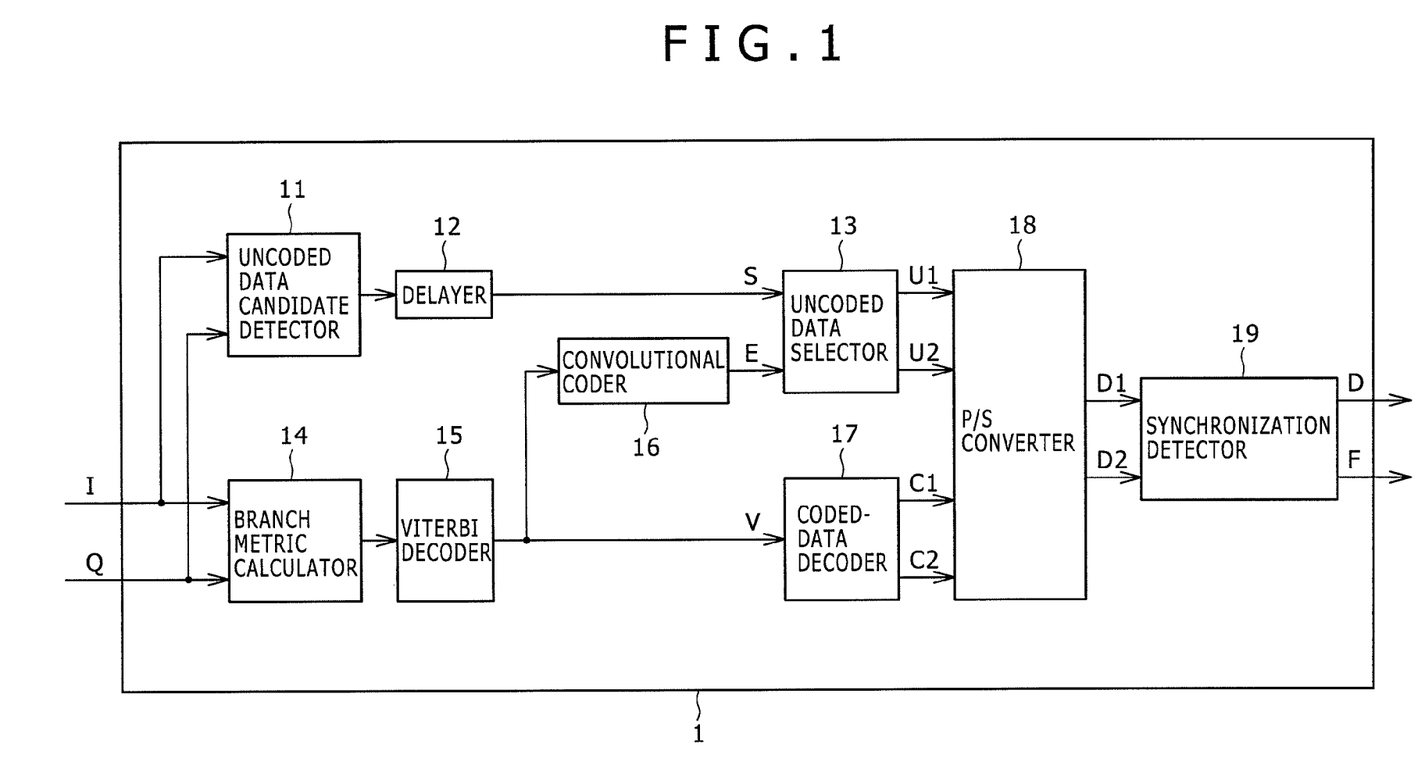
FIG. 1 is a block diagram showing the configuration of a decoding device according to one embodiment of the present invention.

FIG. 1 is a block diagram showing the configuration of a decoding device according to the embodiment of the present invention.

A decoding device 1 of FIG. 1 can be applied to a receiving device that receives a quadrature modulated signal arising from digital modulation of a carrier by multilevel quadrature amplitude modulation such as QAM.

Specifically, as shown in FIG. 1, the decoding device 1 includes an uncoded data candidate detector 11, a delayer 12, an uncoded data selector 13, a branch metric calculator 14, a Viterbi decoder 15, a convolutional coder 16, a coded-data decoder 17, a parallel/serial (P/S) converter 18, and a synchronization detector 19.

To the decoding device 1, in-phase axis data I and quadrature axis data Q as demodulated data obtained by demodulation of e.g. 64-QAM are input.

The respective units in the decoding device 1 are described below in random order. The branch metric calculator 14 calculates a branch metric for Viterbi decoding by the Viterbi decoder 15 at the subsequent stage, if the input demodulated data are convolutionally-coded data. The branch metric calculator 14 outputs the calculated branch metric to the Viterbi decoder 15.

The Viterbi decoder 15 executes Viterbi decoding by using the branch metric from the branch metric calculator 14, to thereby generate Viterbi-decoded data V. The Viterbi decoder 15 outputs the generated Viterbi-decoded data V to the convolutional coder 16 and the coded-data decoder 17.

The convolutional coder 16 has e.g. the configuration shown in the above-described Document 1, and codes the Viterbi-decoded data V from the Viterbi decoder 15. The convolutional coder 16 outputs, to the uncoded data selector 13, convolutionally-coded data E obtained by the coding of the Viterbi-decoded data V.

If the Viterbi-decoded data V from the Viterbi decoder 15 is data coded in advance, the coded-data decoder 17 executes additional predetermined decoding processing for the Viterbi-decoded data V.

Specifically, the coded-data decoder 17 executes the predetermined decoding processing for the Viterbi-decoded data V from the Viterbi decoder 15, and outputs decoded data C1 resulting from the decoding processing to the P/S converter 18. In addition, the coded-data decoder 17 outputs decoded data C2 to the P/S converter 18 simultaneously with the decoded data C1. The decoded data C2 corresponds to the data obtained by decoding the coded data of the demodulated data corresponding to the case in which the in-phase axis data I and the quadrature axis data Q are interchanged.

The details of the decoding processing by the coded-data decoder 17 will be described later with reference to FIGS. 5 and 6.

The uncoded data candidate detector 11 makes a hard decision as to the demodulated data input to the decoding device 1, and detects candidates for uncoded bits from the demodulated data. The uncoded data candidate detector 11 outputs the detected uncoded data candidates to the delayer 12.

The delayer 12 delays the uncoded data candidates from the uncoded data candidate detector 11 so that these uncoded data candidates may be input to the uncoded data selector 13 simultaneously with the convolutionally-coded data E corresponding to these uncoded data candidates. The delayer 12 outputs delayed uncoded data candidates S to the uncoded data selector 13.

To the uncoded data selector 13, the uncoded data candidates S from the delayer 12 and the convolutionally-coded data E from the convolutional coder 16 are input.

The uncoded data selector 13 selects uncoded data U1 from the uncoded data candidates S based on the convolutionally-coded data E, and outputs the uncoded data U1 to the P/S converter 18. In addition, the uncoded data selector 13 outputs uncoded data U2 to the P/S converter 18 simultaneously with the uncoded data U1. The uncoded data U2 corresponds to the demodulated data corresponding to the case in which the in-phase axis data I and the quadrature axis data Q are interchanged.

The details of the selection processing by the uncoded data selector 13 will be described later with reference to FIG. 4.

To the P/S converter 18, the uncoded data U1 and the uncoded data U2 from the uncoded data selector 13 and the decoded data C1 and the decoded data C2 from the coded-data decoder 17 are input.

The P/S converter 18 converts the uncoded data U1 and the decoded data C1 from parallel data to serial data in a predetermined order, and outputs serial data D1 resulting from the conversion to the synchronization detector 19. In addition, the P/S converter 18 converts the uncoded data U2 and the decoded data C2 from parallel data to serial data in a predetermined order, and outputs serial data D2 resulting from the conversion to the synchronization detector 19.

The synchronization detector 19 attempts to detect the boundary between information symbol sequences, for the serial data D1 and the serial data D2 from the P/S converter 18. The synchronization detector 19 outputs, of the serial data D1 and the serial data D2, serial data D from which the boundary can be detected to the subsequent-stage circuit (not shown) together with a signal F indicating the boundary between information symbol sequences (hereinafter, referred to as a boundary signal).

The details of the detection processing by the synchronization detector 19 will be described later with reference to FIGS. 7 and 8.

The decoding device 1 is formed based on the above-described configuration.

The outline of the configuration of the decoding device 1 has been described above with reference to FIG. 1. Subsequently, with reference to FIGS. 2 to 8, the detailed configuration of the decoding device 1 will be described below. In the following, the configurations of the uncoded data selector 13, the coded-data decoder 17, and the synchronization detector 19 in FIG. 1, which are characteristic configurations of the present embodiment, will be mainly described.

Initially, the signal constellation of the demodulated data input to the decoding device 1 will be described below with reference to FIGS. 2 and 3.

Figure 2:
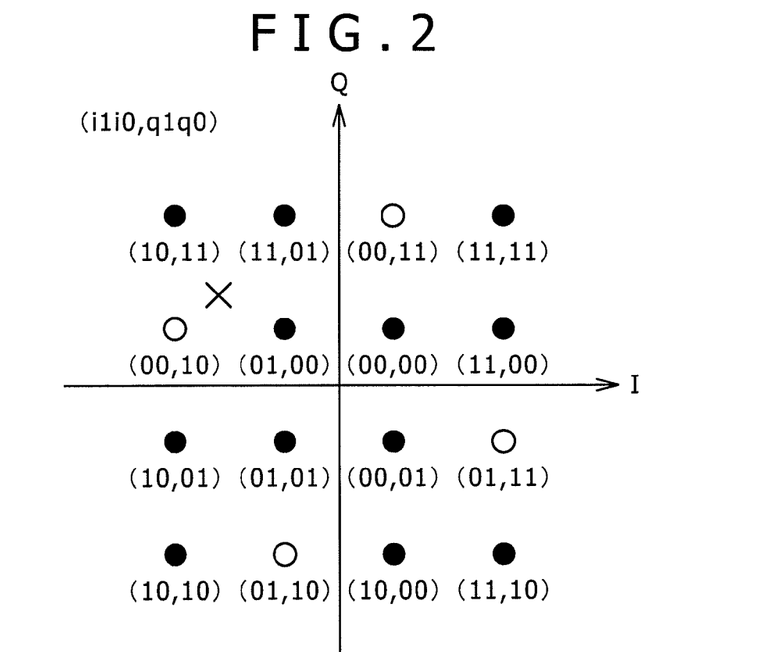
FIG. 2 is a diagram showing an example of the signal constellation of demodulated data input to the decoding device.

FIG. 2 is a diagram showing an example of the signal constellation of the demodulated data input to the decoding device 1. In FIG. 2, a 16-QAM constellation is shown as the signal constellation example for simple description.

Referring to FIG. 2, of the values (i1i0, q1q0) represented under the respective signal points indicated by black circles and white circles, i1 and i0 denote the two-bit value of the in-phase axis (I axis) data, and q1 and q0 denote the two-bit value of the quadrature axis (Q axis) data. Of i1 and i0, i1 denotes an uncoded bit and i0 denotes a coded bit. Of q1 and q0, q1 denotes an uncoded bit and q0 denotes a coded bit.

On the IQ-plane of FIG. 2, four circles are represented in each of the first quadrant to the fourth quadrant. These four circles denote signal points. Four signal points indicated by the white circles, each one of which exists in a respective one of the quadrants, are located at positions obtained by rotation by every 90 degrees. The values of the pair of the uncoded bit i1 and the uncoded bit q1 of all of these four signal points are identical to each other, whereas the values of the pair of the coded bit i0 and the coded bit q0 of all of these four signal points are different from each other. Furthermore, four signal points indicated by the black circles that are located, in the respective quadrants, at positions obtained by phase rotation by every 90 degrees also have the same characteristics as those of the signal points represented by the white circles.

In such a signal constellation example, if the demodulated data input to the decoding device 1 corresponds to the cross mark on the IQ-plane of FIG. 2 for example, the uncoded data candidate detector 11 of FIG. 1 outputs four pairs (0, 0), (0, 1), (1, 0), and (1, 1) as candidates for uncoded data (i1, q1).

Figure 3:
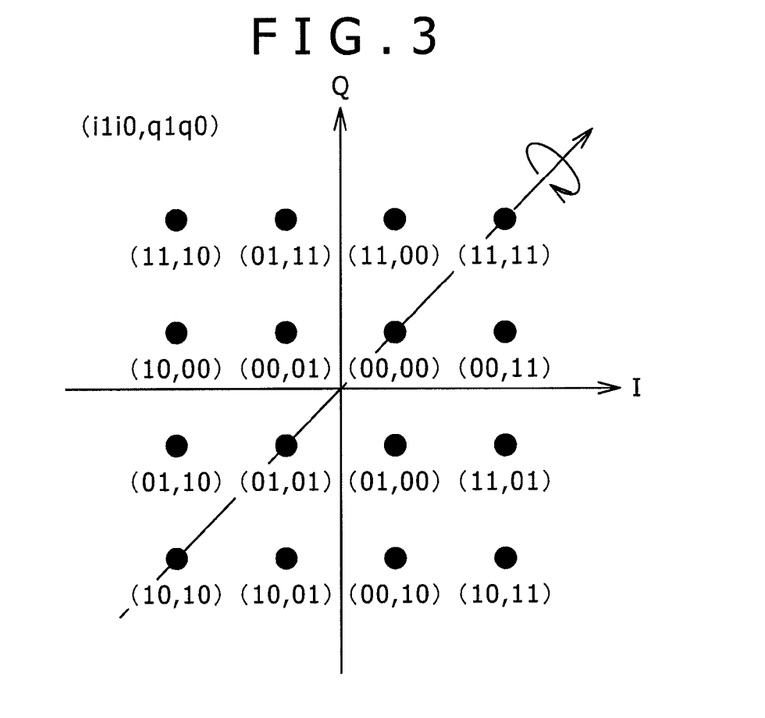
FIG. 3 is a diagram showing an example of the signal constellation of demodulated data when the frequency spectrum is inverted.

On the other hand, if the frequency spectrum of a 16-QAM signal arising from modulation based on the signal constellation example of FIG. 2 is inverted, the demodulated data are interchanged, as shown in FIG. 3, line-symmetrically with respect to a 45-degree straight line (the dashed line in FIG. 3) passing through the origin of the in-phase axis and the quadrature axis, so as to become the data equivalent to the signal constellation shown on the IQ-plane of FIG. 3. If the frequency spectrum is inverted, e.g. the transmitted signal point (01, 11) is demodulated at the position of the signal point (11, 01), and the transmitted signal point (10, 10) is demodulated at the position of the signal point (10, 10). That is, on the IQ-plane of FIG. 3, if the uncoded data of one of the signal points that are in the line-symmetrical relationship is (i1, q1), the uncoded data of the other is (q1, i1).

As shown in FIG. 1, the uncoded data (i1, q1) from the uncoded data candidate detector 11 are input as the uncoded data candidates S to the uncoded data selector 13 after being delayed by the delayer 12 by a predetermined delay amount. In addition, the convolutionally-coded data E (i0, q0) from the convolutional coder 16 are also input to the uncoded data selector 13 as described above.

Figure 4:
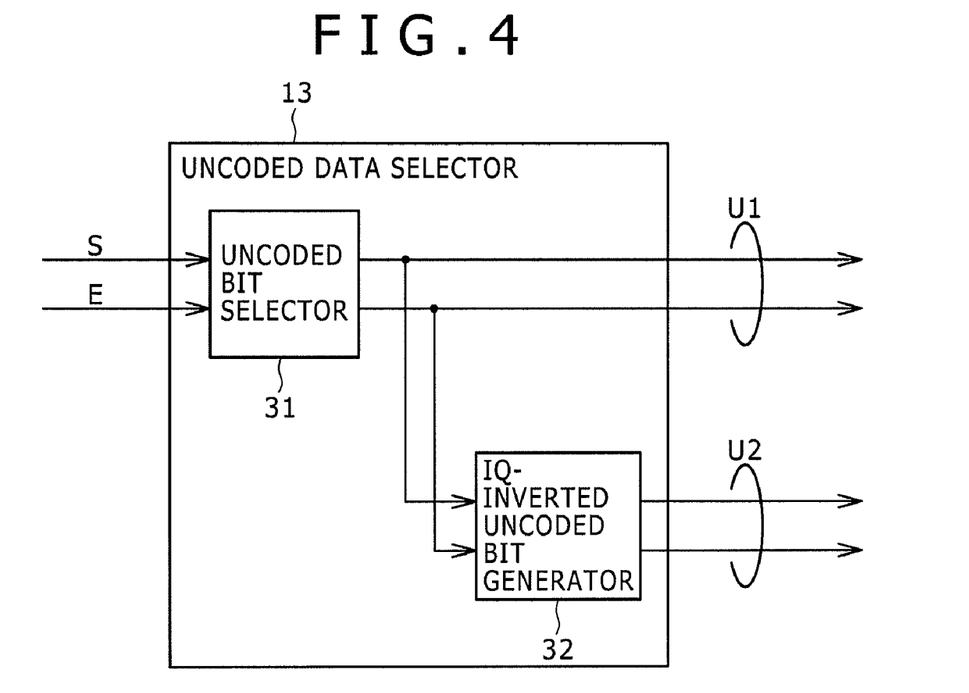
FIG. 4 is a block diagram showing a detailed configuration example of an uncoded data selector.

FIG. 4 is a block diagram showing a detailed configuration example of the uncoded data selector 13 of FIG. 1.

As shown in FIG. 4, the uncoded data selector 13 includes an uncoded bit selector 31 and an IQ-inverted uncoded bit generator 32.

For the signal constellation example of FIG. 2, the uncoded bit selector 31 selects one pair from four pairs of the uncoded data candidates S from the delayer 12 based on the convolutionally-coded data E from the convolutional coder 16. The uncoded bit selector 31 outputs the selected uncoded data U1 to the P/S converter 18 and the IQ-inverted uncoded bit generator 32.

The IQ-inverted uncoded bit generator 32 generates the uncoded bits U2 corresponding to the case in which the frequency spectrum is inverted based on the uncoded data U1 selected by the uncoded bit selector 31.

The following description will deal with e.g. the case in which the demodulated data input to the decoding device 1 corresponds to the cross mark in the signal constellation of FIG. 2.

The uncoded bit selector 31 outputs (0, 1) as the uncoded data U1 if the convolutionally-coded data E (i0, q0) from the convolutional coder 16 is (0, 0). Similarly, if the convolutionally-coded data E (i0, q0) is (0, 1), (1, 0), or (1, 1), the uncoded bit selector 31 outputs (1, 1), (0, 0), or (1, 0), respectively, as the uncoded data U1.

The IQ-inverted uncoded bit generator 32 outputs (0, 0) as the uncoded data U2 if the uncoded data U1 from the uncoded bit selector 31 is (0, 0). Similarly, if the uncoded data U1 is (0, 1), (1, 0), or (1, 1), the IQ-inverted uncoded bit generator 32 outputs (1, 0), (0, 1), or (1, 1), respectively, as the uncoded data U2.

In this manner, the uncoded data U2 corresponding to the case in which the frequency spectrum is inverted can be generated by interchanging the bits of the uncoded data U1 in the uncoded data selector 13. Thus, the uncoded data selector 13 can generate the uncoded data U2 arising from the inversion of the frequency spectrum as well as the normal uncoded data U1. That is, the uncoded data selector 13 always generates also the uncoded data U2 and outputs it to the subsequent-stage P/S converter 18, simultaneously with outputting of the uncoded data U1.

The 16-QAM system is employed as an example for the present embodiment for convenience of description. However, also in the case of another quadrature modulation system such as 64-QAM or 256-QAM, the uncoded data U2 can be generated through similar processing. Of course, if the relationship between the uncoded data U1 and the uncoded data U2 is such that predetermined conversion in addition to the bit interchanging is required to generate the uncoded data U2, the uncoded data U2 can be generated by carrying out this predetermined conversion for the uncoded data U1.

On the other hand, as described above with reference to FIG. 1, the Viterbi-decoded data V generated through the Viterbi decoding by the Viterbi decoder 15 with use of a branch metric from the branch metric calculator 14 is input also to the coded-data decoder 17 besides the convolutional coder 16.

Figure 5:
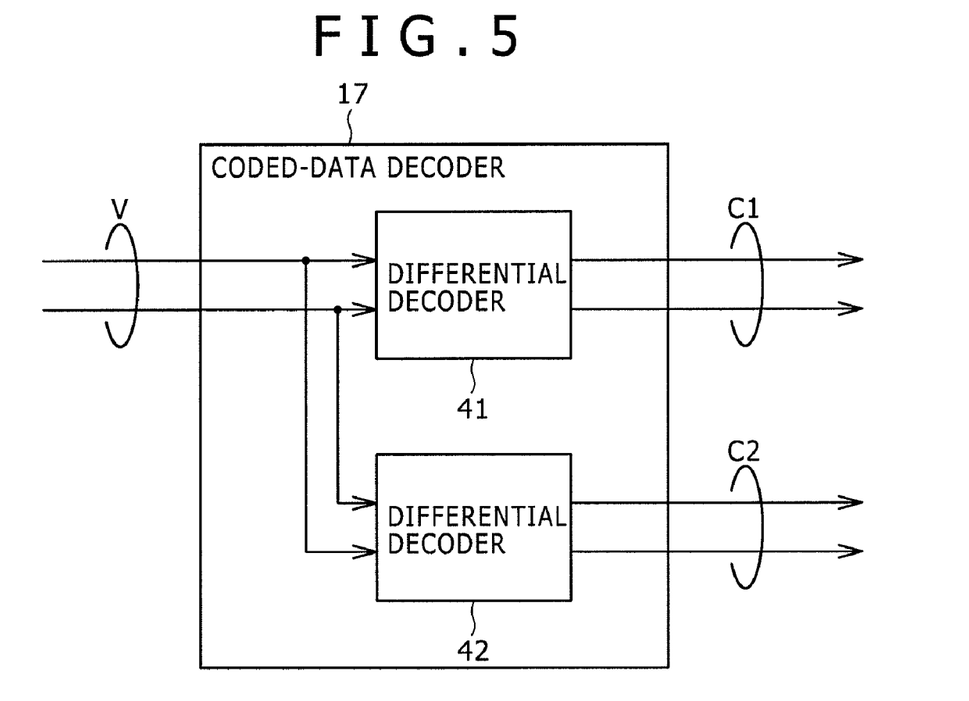
FIG. 5 is a block diagram showing a detailed configuration example of a coded-data decoder.

FIG. 5 is a block diagram showing a detailed configuration example of the coded-data decoder 17.

The coded-data decoder 17 of FIG. 5 corresponds to the case in which the Viterbi-decoded data V from the Viterbi decoder 15 of FIG. 1 is composed of two bits, and includes a differential decoder 41 and a differential decoder 42.

In the coded-data decoder 17 of FIG. 5, the differential decoder 41 on the upper side of FIG. 5 executes normal differential decoding (differential decoding corresponding to the case in which the frequency spectrum is not inverted) for the Viterbi-decoded data V, and outputs the decoded data C1 resulting from the differential decoding to the P/S converter 18. On the other hand, the differential decoder 42 on the lower side of FIG. 5 executes differential decoding after interchanging the in-phase axis bit and the quadrature axis bit of the Viterbi-decoded data V, and outputs the decoded data C2 resulting from the differential decoding to the P/S converter 18. In each of the differential decoder 41 and the differential decoder 42, e.g. the differential decoding corresponding to the differential coding disclosed in the above-described Document 1 is executed.

In this manner, the coded-data decoder 17 of FIG. 5 can output the decoded data C2 corresponding to the case in which the frequency spectrum is inverted, simultaneously with outputting of the normal decoded data C1. Thus, if the frequency spectrum is not inverted, the decoded data C1 obtained through the differential decoding by the differential decoder 41 is the correct decoded data. On the other hand, if the frequency spectrum is inverted, the differential decoder 42 can correctly decode the Viterbi-decoded data V, and therefore the decoded data C2 is the correct decoded data. The coded-data decoder 17 of FIG. 5 outputs both the decoded data C1 and the decoded data C2 to the subsequent-stage P/S converter 18 irrespective of which data is the correct decoded data.

In the coded-data decoder 17 of FIG. 5, two differential decoders, i.e. the differential decoder 41 and the differential decoder 42, are provided and differential decoding of the Viterbi-decoded data V is executed in parallel for both the case in which the frequency spectrum is inverted and the case in which the frequency spectrum is not inverted. However, it is obvious that the following configuration is also available. Specifically, only one differential decoder is provided and the circuit is shared based on double-speed operation for example to thereby allow this differential decoder to execute differential decoding of the Viterbi-decoded data V for both the case in which the frequency spectrum is not inverted and the case in which it is inverted.

Figure 6:
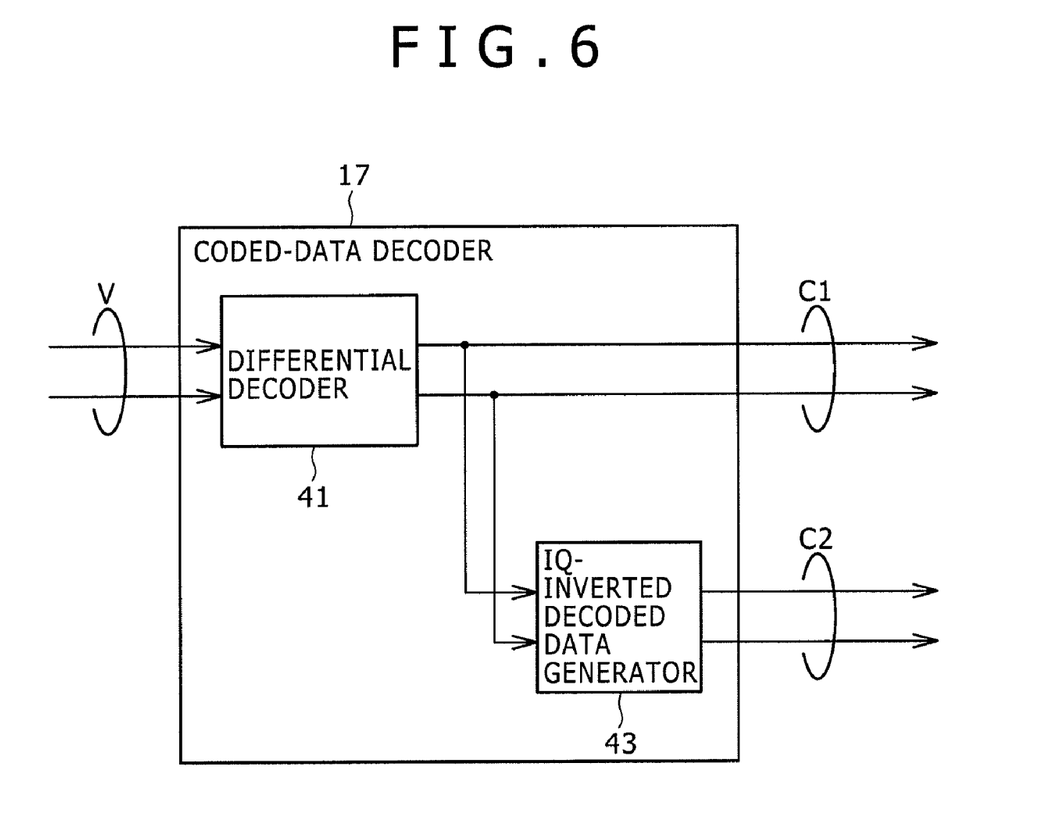
FIG. 6 is a block diagram showing another detailed configuration example of the coded-data decoder.

The configuration of the coded-data decoder 17 of FIG. 1 is not limited to that shown in FIG. 5 but may be that shown in FIG. 6 for example. For the coded-data decoder 17 of FIG. 6, the same part as that in the coded-data decoder 17 of FIG. 5 is given the same numeral, and the description of the part that executes the same processing is omitted to avoid the redundant repetition of explanation.

The coded-data decoder 17 of FIG. 6 is different from that of FIG. 5 in that an IQ-inverted decoded data generator 43 is provided instead of the differential decoder 42. To the IQ-inverted decoded data generator 43, the decoded data C1 from the differential decoder 41 is input.

The IQ-inverted decoded data generator 43 executes predetermined processing corresponding to the configuration of the differential decoder 41 for the decoded data C1 from the differential decoder 41, to thereby generate the decoded data C2. The IQ-inverted decoded data generator 43 outputs the generated decoded data C2 to the P/S converter 18.

The predetermined processing refers to the processing equivalent to the conversion from the decoded data C1 output from the differential decoder 41 to the decoded data C2 output from the differential decoder 42 in FIG. 5. Thus, the coded-data decoder 17 of FIG. 6 can output the decoded data C2 corresponding to the case in which the frequency spectrum is inverted, simultaneously with outputting of the normal decoded data C1.

In this manner, in the present embodiment, the coded data corresponding to the case in which the frequency spectrum is inverted can be decoded or the decoded data can be generated simultaneously with decoding of the normal coded data free from the inversion of the frequency spectrum.

As shown in FIG. 1, the uncoded data U1 and the uncoded data U2 output from the uncoded data selector 13 and the decoded data C1 and the decoded data C2 output from the coded-data decoder 17 are input to the subsequent-stage P/S converter 18. The P/S converter 18 converts parallel data composed of the uncoded data U1 from the uncoded data selector 13 and the decoded data C1 from the coded-data decoder 17 into serial data in a predetermined bit order, and outputs the data as the serial data D1. In addition to the outputting of the serial data D1, the P/S converter 18 converts parallel data composed of the uncoded data U2 from the uncoded data selector 13 and the decoded data C2 from the coded-data decoder 17 into serial data in a predetermined bit order, and outputs the data as the serial data D2.

Figure 7:
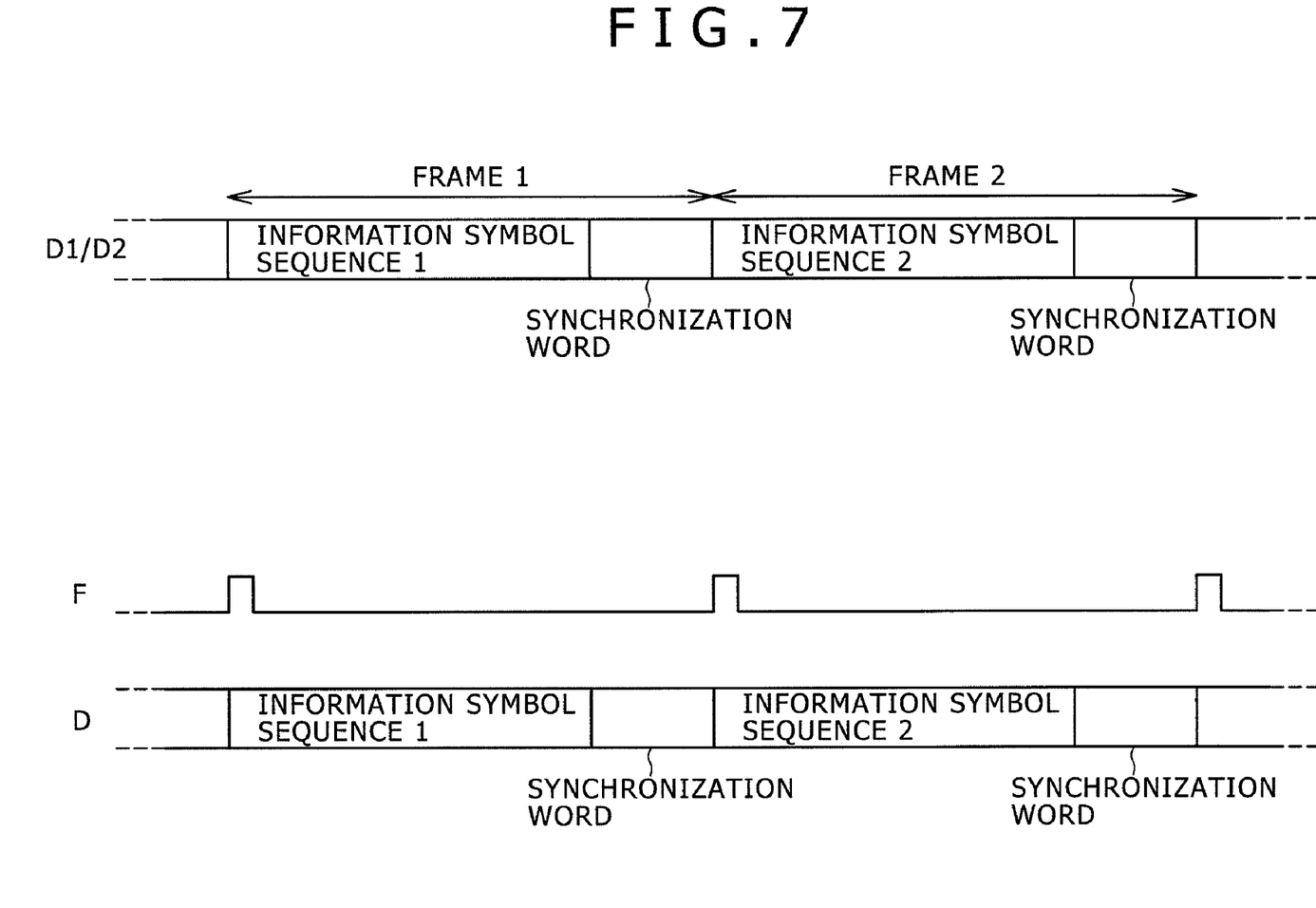
FIG. 7 is a diagram showing an example of input/output data of a synchronization detector.

Due to this operation, the serial data D1 and the serial data D2 from the P/S converter 18 are input to the synchronization detector 19 as data formed of, as shown by "D1/D2" on the upper side of FIG. 7, succession of frames, such as frame 1, frame 2, . . . , that are each composed of an information symbol sequence and a synchronization word indicating a frame boundary, if the serial data D1 and D2 involve no bit error.

The synchronization detector 19 detects the synchronization word indicating a frame boundary (boundary between predetermined information symbol sequences), and selects, from the serial data D1 and the serial data D2, the data from which the synchronization word can be detected as the serial data D. As shown by "F" and "D" on the lower side of FIG. 7, the synchronization detector 19 outputs the selected serial data D to the subsequent-stage circuit together with the boundary signal F indicating frame boundaries.

The detailed configuration of the synchronization detector 19 will be described below with reference to FIG. 8.

Figure 8:
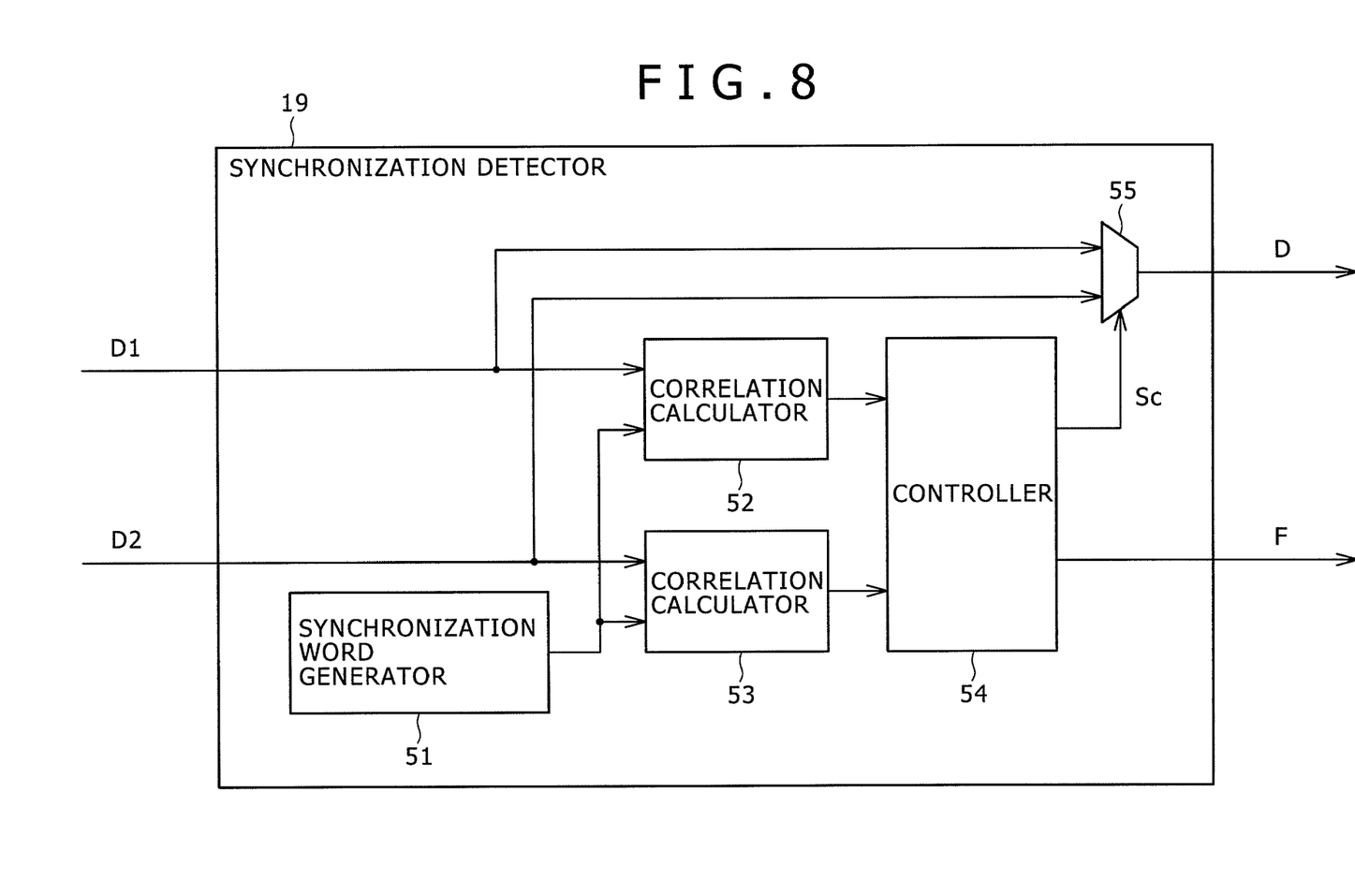
FIG. 8 is a block diagram showing a detailed configuration example of the synchronization detector.

As shown in FIG. 8, the synchronization detector 19 includes a synchronization word generator 51, a correlation calculator 52, a correlation calculator 53, a controller 54, and a selector 55.

The synchronization word generator 51 generates synchronization words included in serial data involving no bit error, shown in FIG. 7. The synchronization word generator 51 outputs the generated synchronization words to the correlation calculator 52 and the correlation calculator 53.

To the correlation calculator 52, the serial data D1 from the P/S converter 18 and the synchronization words generated by the synchronization word generator 51 are input. The correlation calculator 52 calculates the correlation between the serial data D1 and the synchronization words and outputs a correlation value as the calculation result to the controller 54.

To the correlation calculator 53, the serial data D2 from the P/S converter 18 and the synchronization words generated by the synchronization word generator 51 are input. Similarly to the correlation calculator 52, the correlation calculator 53 calculates the correlation between the serial data D2 and the synchronization words and outputs a correlation value to the controller 54.

To the controller 54, the correlation value is input from each of the correlation calculator 52 and the correlation calculator 53. The controller 54 compares a preset correlation threshold with two correlation values input from the correlation calculator 52 and the correlation calculator 53, and outputs a selection signal Sc corresponding to the comparison result to the selector 55.

Specifically, for example, the controller 54 outputs the selection signal Sc indicating selection of the serial data D1 to the selector 55 if the correlation value of the serial data D1 is equal to or larger than the correlation threshold and the correlation value of the serial data D2 is smaller than the correlation threshold. On the other hand, the controller 54 outputs the selection signal Sc indicating selection of the serial data D2 to the selector 55 if the correlation value of the serial data D1 is smaller than the correlation threshold and the correlation value of the serial data D2 is equal to or larger than the correlation threshold. Furthermore, the controller 54 outputs the selection signal Sc indicating selection of predetermined serial data, e.g. the serial data D1, to the selector 55 if the correlation value of the serial data D1 is smaller than the correlation threshold and the correlation value of the serial data D2 is smaller than the correlation threshold, or if the correlation value of the serial data D1 is equal to or larger than the correlation threshold and the correlation value of the serial data D2 is equal to or larger than the correlation threshold. Alternatively, the controller 54 outputs, to the selector 55, the selection signal Sc indicating selection of the serial data whose correlation value is larger than that of the other serial data if the correlation value of the serial data D1 is equal to or larger than the correlation threshold and the correlation value of the serial data D2 is equal to or larger than the correlation threshold.

To the selector 55, the serial data D1 and the serial data D2 from the P/S converter 18 and the selection signal Sc from the controller 54 are input. The selector 55 selects either one of the serial data D1 and the serial data D2 based on the selection signal Sc from the controller 54, and outputs the selected data as the serial data D to the subsequent-stage circuit (not shown).

In addition, as shown in FIG. 7, simultaneously with the outputting of the selection signal Sc to the selector 55, the controller 54 outputs the boundary signal F indicating the frame boundaries in the serial data corresponding to the selection signal Sc to the subsequent-stage circuit (not shown) in synchronization with the serial data D.

In the synchronization detector 19 of FIG. 8, two correlation calculators, i.e. the correlation calculator 52 and the correlation calculator 53, are provided and the correlation between serial data and synchronization words is calculated for both the case in which the frequency spectrum is inverted and the case in which the frequency spectrum is not inverted. However, it is obvious that the following configuration is also available. Specifically, only one correlation calculator is provided and the circuit is shared based on double-speed operation for example to thereby allow this correlation calculator to calculate the correlation for both the case in which the frequency spectrum is not inverted and the case in which it is inverted.

In the above-described manner, synchronization detection is simultaneously carried out for both the serial data of the case in which the frequency spectrum is not inverted and the serial data of the case in which the frequency spectrum is inverted, and the serial data from which synchronization can be detected is selected. Thus, irrespective of whether or not the frequency spectrum is inverted, synchronization detection can be carried out in the time equivalent to that required for the case in which normal processing is executed without taking into consideration the inversion of the frequency spectrum.

The processing executed in the decoding device 1 will be described below.

Figure 9:
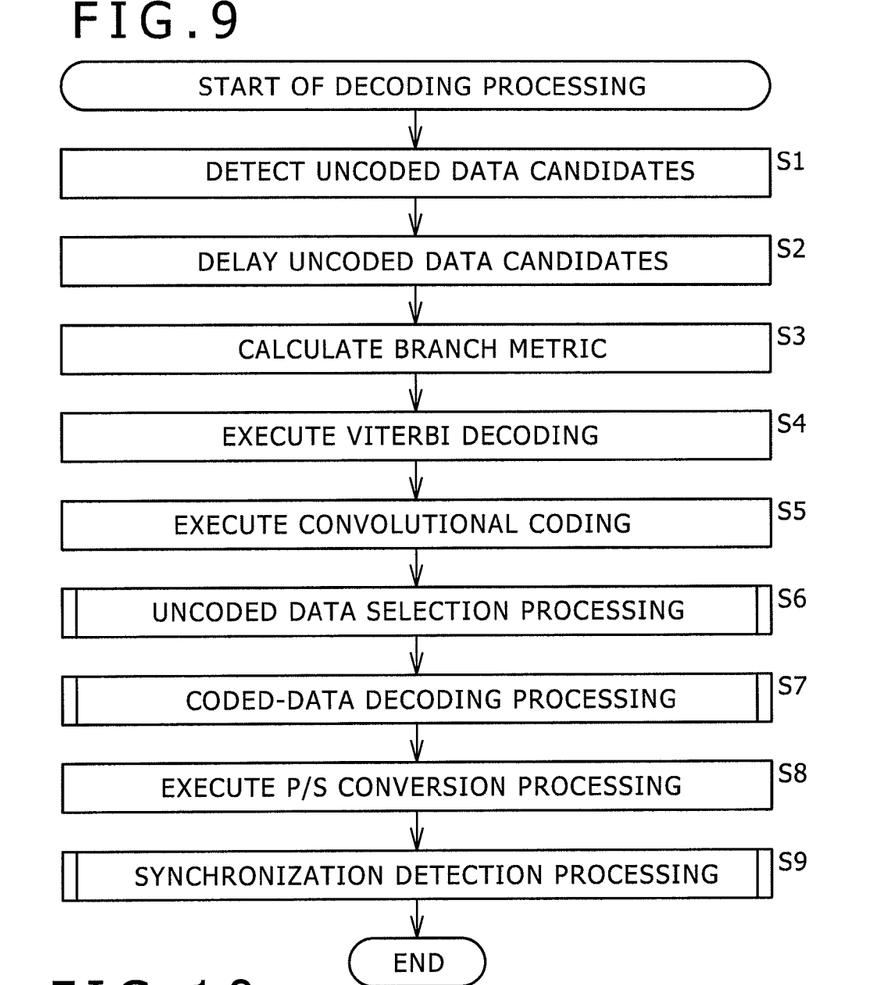
FIG. 9 is a flowchart for explaining decoding processing.

Initially, the decoding processing by the decoding device 1 will be described below with reference to the flowchart of FIG. 9.

In step S1, the uncoded data candidate detector 11 makes a hard decision as to input demodulated data, and detects candidates for the uncoded bits so as to output the candidates to the delayer 12.

In step S2, the delayer 12 outputs the uncoded data candidates from the uncoded data candidate detector 11 to the uncoded data selector 13 after delaying these uncoded data candidates so that these uncoded data candidates may be input to the uncoded data selector 13 simultaneously with the convolutionally-coded data E corresponding to these uncoded data candidates.

In step S3, the branch metric calculator 14 calculates a branch metric and outputs it to the Viterbi decoder 15 if the input demodulated data is convolutionally-coded data.

In step S4, the Viterbi decoder 15 executes Viterbi decoding by using the branch metric from the branch metric calculator 14, and outputs the Viterbi-decoded data V obtained by the Viterbi decoding to the convolutional coder 16 and the coded-data decoder 17.

In step S5, the convolutional coder 16 codes the Viterbi-decoded data V from the Viterbi decoder 15 and outputs the convolutionally-coded data E obtained by the coding to the uncoded data selector 13.

In step S6, the uncoded data selector 13 executes processing of selecting the uncoded data U1 from the uncoded data candidates S based on the convolutionally-coded data E, and generating the uncoded data U2 corresponding to the demodulated data corresponding to the case in which the in-phase axis data I and the quadrature axis data Q are interchanged (hereinafter, this processing will be referred to as the uncoded data selection processing). The uncoded data selector 13 outputs the uncoded data U1 and the uncoded data U2 to the P/S converter 18.

Figure 10:
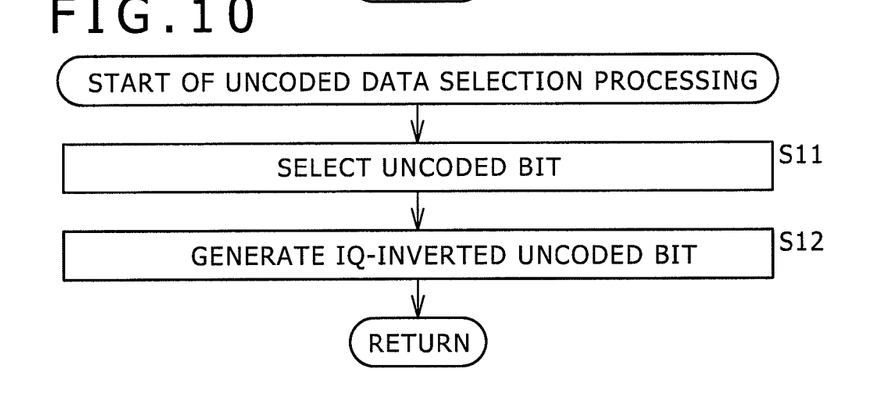
FIG. 10 is a flowchart for explaining uncoded data selection processing by the uncoded data selector of FIG. 4.

The details of the uncoded data selection processing will be described later with reference to the flowchart of FIG. 10.

In step S7, the coded-data decoder 17 executes processing of obtaining the decoded data C1 by executing predetermined decoding processing for the Viterbi-decoded data V from the Viterbi decoder 15, and obtaining the decoded data C2 corresponding to the data obtained by decoding the coded data of the demodulated data corresponding to the case in which the in-phase axis data I and the quadrature axis data Q are interchanged (hereinafter, this processing will be referred to as the coded-data decoding processing). The coded-data decoder 17 outputs the decoded data C1 and the decoded data C2 to the P/S converter 18.

The details of the coded-data decoding processing will be described later with reference to the flowcharts of FIGS. 11 and 12.

In step S8, the P/S converter 18 converts the pair of the uncoded data U1 and the decoded data C1 and the pair of the uncoded data U2 and the decoded data C2 from parallel data to serial data in a predetermined order, and outputs the serial data D1 and the serial data D2 resulting from the conversion to the synchronization detector 19.

In step S9, the synchronization detector 19 executes processing of attempting to detect the information symbol sequence boundary for the serial data D1 and the serial data D2 from the P/S converter 18, and outputting, of the serial data D1 and the serial data D2, the serial data D from which the boundary can be detected to the subsequent-stage circuit (not shown) together with the boundary signal F (hereinafter, this processing will be referred to as the synchronization detection processing), so that the decoding processing is ended.

Figure 13:
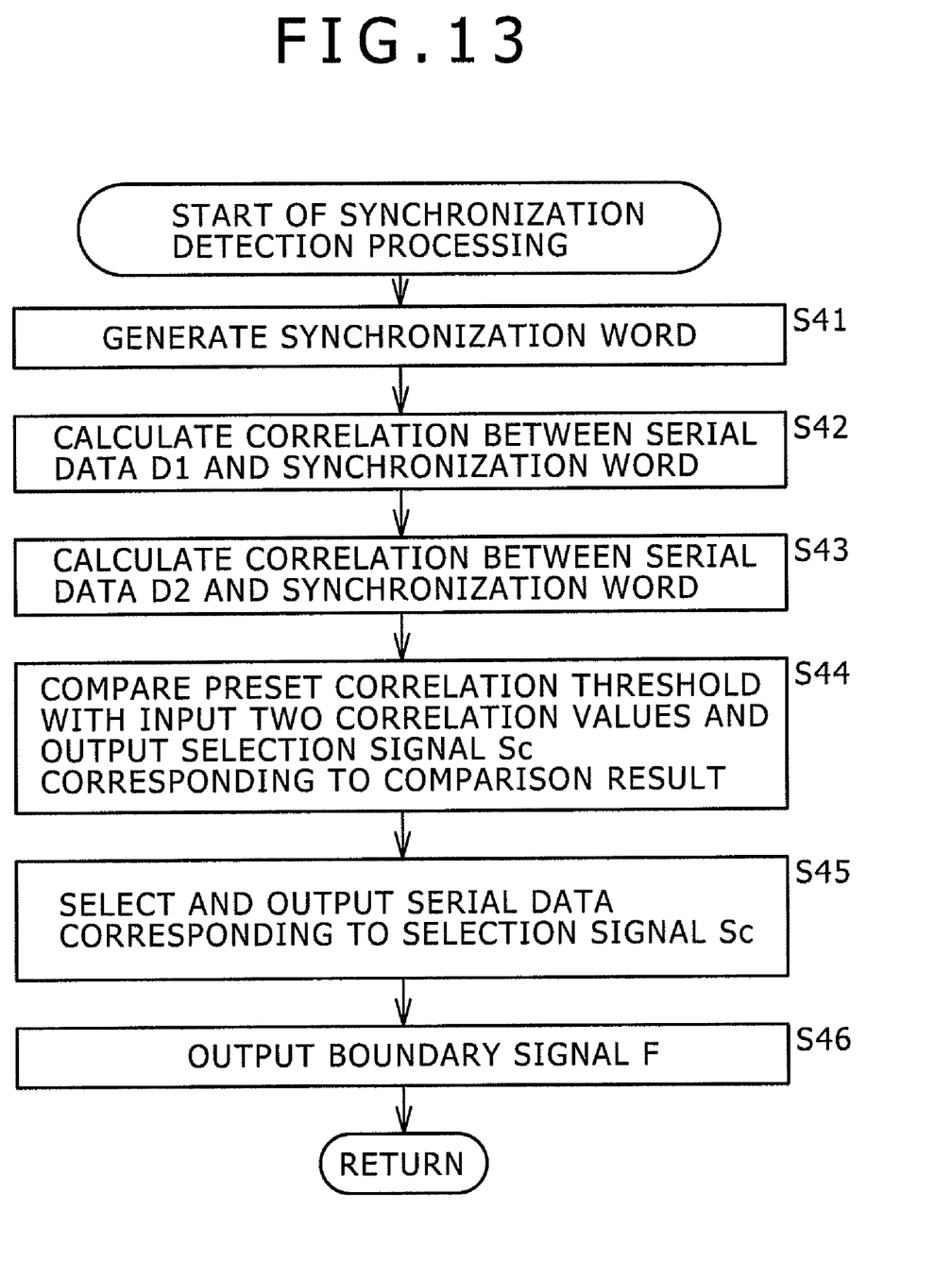
FIG. 13 is a flowchart for explaining synchronization detection processing by the synchronization detector of FIG. 8.

The details of the synchronization detection processing will be described later with reference to the flowchart of FIG. 13.

With reference to the flowchart of FIG. 10, the uncoded data selection processing executed by the uncoded data selector 13 of FIG. 4, corresponding to the processing of step S6 in FIG. 9, will be described below.

In step S11, the uncoded bit selector 31 selects e.g. one group from four groups of the uncoded data candidates S from the delayer 12 based on the convolutionally-coded data E from the convolutional coder 16, and outputs the selected uncoded data U1 to the P/S converter 18 and the IQ-inverted uncoded bit generator 32.

In step S12, the IQ-inverted uncoded bit generator 32 generates the uncoded bits U2 corresponding to the case in which the frequency spectrum is inverted based on the uncoded data U1 selected by the uncoded bit selector 31, and outputs the uncoded bit U2 to the P/S converter 18.

Due to this operation, the uncoded bits U2 are also input to the P/S converter 18 simultaneously with the uncoded data U1. Thereafter, the processing sequence returns to the processing of step S6 in FIG. 9.

With reference to the flowchart of FIG. 11, the coded-data decoding processing executed by the coded-data decoder 17 of FIG. 5, corresponding to the processing of step S7 in FIG. 9, will be described below.

In step S21, the differential decoder 41 executes normal differential decoding processing for the Viterbi-decoded data V, and outputs the decoded data C1 resulting from the processing to the P/S converter 18.

In step S22, the differential decoder 42 executes differential decoding after interchanging the in-phase axis bit and the quadrature axis bit of the Viterbi-decoded data V, and outputs the decoded data C2 resulting from the differential decoding to the P/S converter 18.

Due to this operation, the decoded data C2 is also input to the P/S converter 18 simultaneously with the decoded data C1. Thereafter, the processing sequence returns to the processing of step S7 in FIG. 9.

With reference to the flowchart of FIG. 12, the coded-data decoding processing executed by the coded-data decoder 17 of FIG. 6, corresponding to the processing of step S7 in FIG. 9, will be described below.

Figure 11:
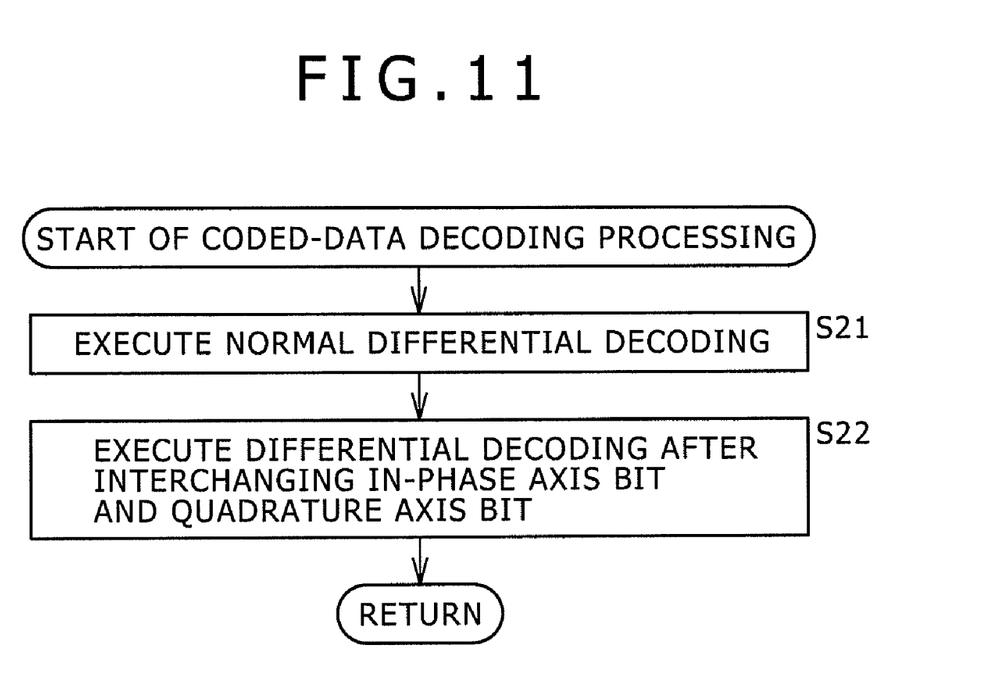
FIG. 11 is a flowchart for explaining coded-data decoding processing by the coded-data decoder of FIG. 5.
Figure 12:
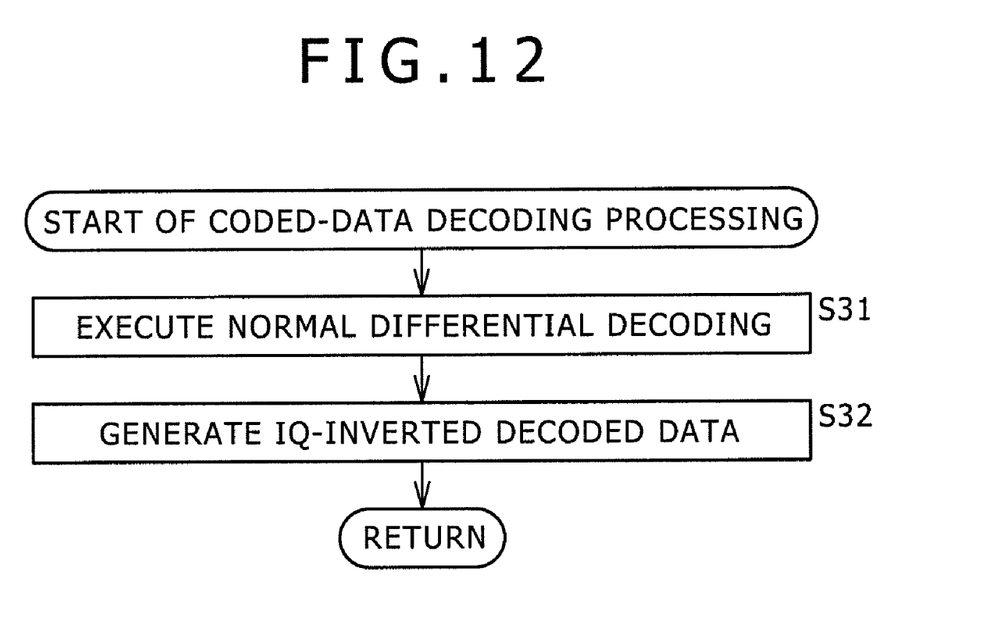
FIG. 12 is a flowchart for explaining coded-data decoding processing by the coded-data decoder of FIG. 6.

In step S31, similarly to the processing of step S21 in FIG. 11, normal differential decoding processing is executed by the differential decoder 41, and the decoded data C1 resulting from the processing is output to the P/S converter 18 and the IQ-inverted decoded data generator 43.

In step S32, the IQ-inverted decoded data generator 43 executes predetermined processing corresponding to the configuration of the differential decoder 41 for the decoded data C1 from the differential decoder 41, and outputs the decoded data C2 generated by this processing to the P/S converter 18.

Due to this operation, the decoded data C2 is also input to the P/S converter 18 simultaneously with the decoded data C1, similarly to the processing of the flowchart of FIG. 11. Thereafter, the processing sequence returns to the processing of step S7 in FIG. 9.

With reference to the flowchart of FIG. 13, the synchronization detection processing executed by the synchronization detector 19 of FIG. 8, corresponding to the processing of step S9 in FIG. 9, will be described below.

In step S41, the synchronization word generator 51 generates synchronization words included in serial data involving no bit error, and outputs the synchronization words to the correlation calculator 52 and the correlation calculator 53.

In step S42, the correlation calculator 52 calculates the correlation between the serial data D1 from the P/S converter 18 and the synchronization words from the synchronization word generator 51, and outputs a correlation value as the calculation result to the controller 54.

In step S43, the correlation calculator 53 calculates the correlation between the serial data D2 from the P/S converter 18 and the synchronization words from the synchronization word generator 51, and outputs a correlation value as the calculation result to the controller 54.

In step S44, the controller 54 compares a preset correlation threshold with two correlation values input from the correlation calculator 52 and the correlation calculator 53, and outputs the selection signal Sc corresponding to the comparison result to the selector 55.

In step S45, the selector 55 selects either one of the serial data D1 and the serial data D2 from the P/S converter 18 based on the selection signal Sc from the controller 54, and outputs the selected data as the serial data D to the subsequent-stage circuit (not shown).

In step S46, the controller 54 outputs, to the subsequent-stage circuit (not shown), the boundary signal F indicating the frame boundaries in the serial data corresponding to the selection signal Sc output to the selector 55, in synchronization with the serial data D. Thereafter, the processing sequence returns to the processing of step S9 in FIG. 9.

As described above, according to the embodiment of the present invention, even when the frequency spectrum is inverted between modulation and demodulation, synchronization is allowed at high speed in the time equivalent to that required for the case in which normal processing is executed without taking into consideration the inversion of the frequency spectrum, without reattempting synchronization detection and so on.

The above-described series of processing can be executed by hardware, or alternatively can be executed by software. If the series of processing is executed by software, a program of the software is installed from a program recording medium in a computer incorporated in dedicated hardware, or e.g. a general-purpose personal computer that is allowed to execute various functions through installation of various kinds of programs therein.

Figure 14:
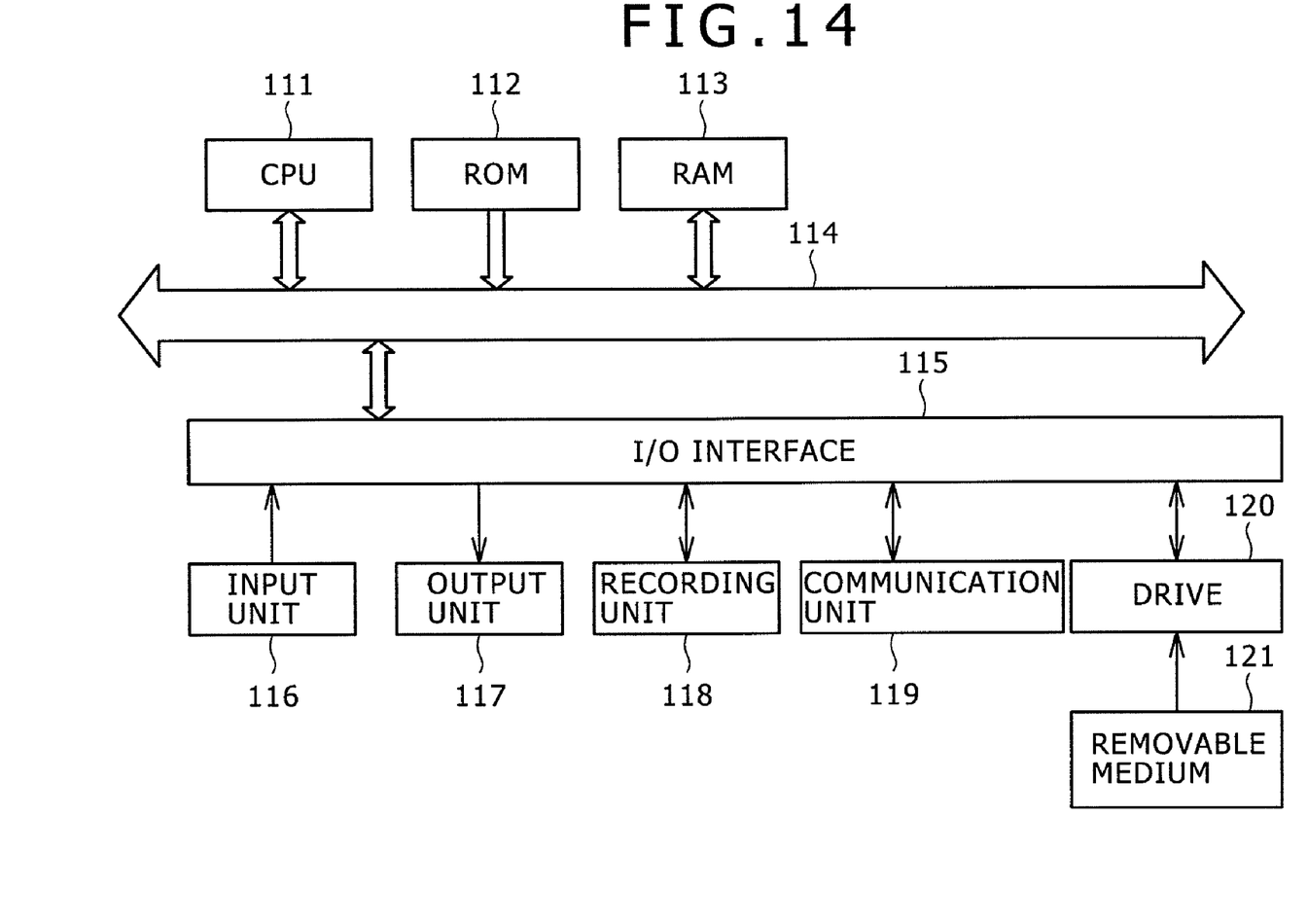
FIG. 14 is a block diagram showing a configuration example of a computer that executes, based on software, the decoding processing according to the embodiment of the present invention.

FIG. 14 is a block diagram showing an example of the configuration of a personal computer that executes the above-described series of processing based on a program. A central processing unit (CPU) 111 executes various kinds of processing in accordance with a program recorded in a read only memory (ROM) 112 or a recording unit 118. A program to be executed by the CPU 111, data, and so on are stored in a random access memory (RAM) 113. The CPU 111, the ROM 112, and the RAM 113 are connected to each other via a bus 114.

An input/output (I/O) interface 115 is also connected to the CPU 111 via the bus 114. To the I/O interface 115, an input unit 116 formed of a microphone and so on, and an output unit 117 formed of a display, a speaker, and so on are connected. The CPU 111 executes various kinds of processing in response to commands input via the input unit 116. The CPU 111 outputs the results of the processing to the output unit 117.

The recording unit 118 connected to the I/O interface 115 is formed of e.g. a hard disc and a program to be executed by the CPU 111 and various kinds of data are recorded therein. A communication unit 119 communicates with an external device via a network such as the Internet or a local area network.

A program acquired via the communication unit 119 may be recorded in the recording unit 118.

When a removable medium 121 such as a magnetic disc, optical disc, magneto-optical disc, or semiconductor memory is loaded in a drive 120 connected to the I/O interface 115, the drive 120 drives the removable medium 121 so as to acquire a program, data, and so on recorded therein. The acquired program and data are transferred to the recording unit 118 and recorded therein according to need.

The program recording medium for storing the program that is installed in a computer and is set to the state of being executable by the computer is formed of e.g. any of the following entities as shown in FIG. 14: the removable medium 121 as a package medium formed of a magnetic disc (encompassing a flexible disc), optical disc (encompassing a compact disc-read only memory (CD-ROM) and a digital versatile disc (DVD)), magneto-optical disc, semiconductor memory, or the like; the ROM 112 in which the program is temporarily or permanently stored; and a hard disc serving as the recording unit 118. Storing of the program in the program recording medium is carried out by utilizing a wired or wireless communication medium such as a local area network, the Internet, or digital satellite broadcasting via the communication unit 119 as an interface such as a router or a modem according to need.

In the present specification, the steps that describe the program stored in the recording medium encompass not only processing that is to be executed along the described order in a time-series manner but also processing that is not necessarily to be executed in a time-series manner but to be executed in parallel or individually.

It should be noted that embodiments of the present invention are not limited to the above-described embodiment but various modifications might be incorporated therein without departing from the scope and spirit of the present invention.

What is claimed is:

1. A decoding device that decodes demodulated data obtained by demodulating a quadrature modulated signal arising from digital modulation of a carrier and detects synchronization, the decoding device comprising:
    a decoder configured to decode first demodulated data that is the demodulated data obtained by demodulating the quadrature modulated signal and is composed of in-phase axis data and quadrature axis data, and decode second demodulated data obtained by interchanging the in-phase axis data and the quadrature axis data of the first demodulated data; and
    a synchronization detector configured to detect a boundary between predetermined information symbol sequences from first decoded data obtained by decoding the first demodulated data and detect the boundary from second decoded data obtained by decoding the second demodulated data, the synchronization detector selecting and outputting one of the first decoded data and the second decoded data based on a result of the detection of the boundary.

2. The decoding device according to claim 1, wherein at least one bit of the demodulated data is a differentially-coded bit, and the decoder executes differential decoding of the first demodulated data to thereby output the first decoded data, and executes differential decoding of the second demodulated data to thereby output the second decoded data.

3. The decoding device according to claim 1, wherein a predetermined synchronization word is included in the demodulated data, and the synchronization detector calculates correlation between the first decoded data and the synchronization word and correlation between the second decoded data and the synchronization word, and selects and outputs one of the first decoded data and the second decoded data based on a result of comparison between correlation values obtained by the calculation with a predetermined threshold.

4. The decoding device according to claim 1, wherein at least one bit of the demodulated data is a differentially-coded bit, and the decoder executes differential decoding of the first demodulated data to thereby generate the first decoded data, and generates the second decoded data from the generated first decoded data.

5. The decoding device according to claim 1, further comprising an uncoded data detector configured to detect an uncoded bit from the demodulated data, wherein the uncoded data detector selects first uncoded data and generates second uncoded data corresponding to the second demodulated data based on the first demodulated data and data obtained by recoding decoded data of a coded bit of the first demodulated data.

6. A decoding method of a decoding device that decodes demodulated data obtained by demodulating a quadrature modulated signal arising from digital modulation of a carrier and detects synchronization, the decoding method comprising the steps of:

decoding first demodulated data that is the demodulated data obtained by demodulating the quadrature modulated signal and is composed of in-phase axis data and quadrature axis data, and decoding second demodulated data obtained by interchanging the in-phase axis data and the quadrature axis data of the first demodulated data; and detecting a boundary between predetermined information symbol sequences from first decoded data obtained by decoding the first demodulated data and detecting the boundary from second decoded data obtained by decoding the second demodulated data, and selecting and outputting one of the first decoded data and the second decoded data based on a result of the detection of the boundary.

7. A non-transitory computer-readable storage medium having stored thereon a program for causing a computer to execute decoding processing of decoding demodulated data obtained by demodulating a quadrature modulated signal arising from digital modulation of a carrier and detecting synchronization, the decoding processing comprising the steps of:

decoding first demodulated data that is the demodulated data obtained by demodulating the quadrature modulated signal and is composed of in-phase axis data and quadrature axis data, and decoding second demodulated data obtained by interchanging the in-phase axis data and the quadrature axis data of the first demodulated data; and detecting a boundary between predetermined information symbol sequences from first decoded data obtained by decoding the first demodulated data and detecting the boundary from second decoded data obtained by decoding the second demodulated data, and selecting and outputting one of the first decoded data and the second decoded data based on a result of the detection of the boundary.

8. A receiving device that receives a quadrature modulated signal arising from digital modulation of a carrier, the receiving device comprising:

a decoder configured to decode first demodulated data that is demodulated data obtained by demodulating the quadrature modulated signal and is composed of in-phase axis data and quadrature axis data, and decode second demodulated data obtained by interchanging the in-phase axis data and the quadrature axis data of the first demodulated data; and a synchronization detector configured to detect a boundary between predetermined information symbol sequences from first decoded data obtained by decoding the first demodulated data and detect the boundary from second decoded data obtained by decoding the second demodulated data, the synchronization detector selecting and outputting one of the first decoded data and the second decoded data based on a result of the detection of the boundary.

9. A receiving method of a receiving device that receives a quadrature modulated signal arising from digital modulation of a carrier, the receiving method comprising the steps of:

decoding first demodulated data that is demodulated data obtained by demodulating the quadrature modulated signal and is composed of in-phase axis data and quadrature axis data, and decoding second demodulated data obtained by interchanging the in-phase axis data and the quadrature axis data of the first demodulated data; and detecting a boundary between predetermined information symbol sequences from first decoded data obtained by decoding the first demodulated data and detecting the boundary from second decoded data obtained by decoding the second demodulated data, and selecting and outputting one of the first decoded data and the second decoded data based on a result of the detection of the boundary.

10. A non-transitory computer-readable storage medium having stored thereon a program for causing a computer to execute reception processing of receiving a quadrature modulated signal arising from digital modulation of a carrier, the reception processing comprising the step of:

decoding first demodulated data that is demodulated data obtained by demodulating the quadrature modulated signal and is composed of in-phase axis data and quadrature axis data, and decoding second demodulated data obtained by interchanging the in-phase axis data and the quadrature axis data of the first demodulated data; and detecting a boundary between predetermined information symbol sequences from first decoded data obtained by decoding the first demodulated data and detecting the boundary from second decoded data obtained by decoding the second demodulated data, and selecting and outputting one of the first decoded data and the second decoded data based on a result of the detection of the boundary.

* * * * *